(12) United States Patent
Buday

(10) Patent No.: US 11,535,145 B2
(45) Date of Patent: Dec. 27, 2022

(54) RECREATIONAL VEHICLE TRAILER CHASSIS

(71) Applicant: John Michael Kenneth Buday, Burlington (CA)

(72) Inventor: John Michael Kenneth Buday, Burlington (CA)

( * ) Notice: Subject to any disclaimer, the term of this patent is extended or adjusted under 35 U.S.C. 154(b) by 358 days.

(21) Appl. No.: 16/899,153

(22) Filed: Jun. 11, 2020

(65) Prior Publication Data
US 2021/0387560 A1 Dec. 16, 2021

(51) Int. Cl.
*B62D 21/20* (2006.01)
*B62D 23/00* (2006.01)
*B60P 3/34* (2006.01)
*B60P 3/36* (2006.01)
*B60D 1/48* (2006.01)

(52) U.S. Cl.
CPC .............. *B60P 3/34* (2013.01); *B60D 1/488* (2013.01); *B60P 3/36* (2013.01); *B62D 21/20* (2013.01); *B62D 23/005* (2013.01)

(58) Field of Classification Search
CPC .... B62D 21/20; B62D 23/005; B62D 53/061; B60P 3/32; B60P 3/34; B60P 3/36; B60D 1/488
See application file for complete search history.

(56) References Cited

U.S. PATENT DOCUMENTS

| | | | |
|---|---|---|---|
| 6,186,692 B1* | 2/2001 | Hanser | B60P 3/34 52/79.5 |
| 6,343,830 B1* | 2/2002 | Ingram | B62D 53/061 280/433 |
| 6,502,894 B1* | 1/2003 | Ingram | B62D 21/20 280/789 |
| 8,662,525 B1* | 3/2014 | Dierks | B62D 63/061 280/789 |
| 11,235,637 B1* | 2/2022 | Goldenberg | B60H 1/00564 |

(Continued)

*Primary Examiner* — Gregory A Blankenship
(74) *Attorney, Agent, or Firm* — Ritchison Law Offices, PC; John D Ritchison

(57) ABSTRACT

The recreational vehicle trailer chassis includes two main frame rails running front to back with a series of perpendicular connecting main cross-members to form a structural configuration increasing the torsional rigidity of the frame. The main floor and support framing has a front and rear living area generally divided by the direction of structural trusses. Above the rear and middle main frame rails is the rear and middle floor framing formed with a plurality of frame members. Between the rear and middle main frame rails and below the rear and middle main floor support framing are structural web beam trusses perpendicular to the main frame rails along with vertical support columns that connect the lower main frame to the rear and middle living area floor framing further increasing structural torsional rigidity. Above the forward main frame rails and vertical support columns is the front floor framing with a plurality of frame members along with structural web beam trusses running parallel with the forward living area floor. Outward from the main frame rails and vertical floor support columns is the front to back side saddle framing to allow access to the basement area internally and externally. The furthermost forward floor framing sections are where the hitch structure and hitch are located.

15 Claims, 4 Drawing Sheets

(56) References Cited

U.S. PATENT DOCUMENTS

| | | | | |
|---|---|---|---|---|
| 2005/0134033 A1* | 6/2005 | Budica | ............... | B60P 3/34 |
| | | | | 280/781 |
| 2007/0007794 A1* | 1/2007 | Bertoch | ............... | B62D 21/20 |
| | | | | 296/168 |
| 2007/0290495 A1* | 12/2007 | Biscan | ............... | B62D 21/20 |
| | | | | 280/789 |
| 2011/0121554 A1* | 5/2011 | Olson | ............... | B62D 21/20 |
| | | | | 280/781 |
| 2011/0254305 A1* | 10/2011 | Gogola | ............... | B60P 3/34 |
| | | | | 296/26.13 |
| 2012/0261902 A1* | 10/2012 | Graber | ............... | B60P 3/32 |
| | | | | 280/433 |
| 2014/0151141 A1* | 6/2014 | Ehl | ............... | B60K 5/00 |
| | | | | 296/193.07 |
| 2015/0291229 A1* | 10/2015 | Connor | ............... | B60P 3/32 |
| | | | | 296/168 |
| 2021/0129918 A1* | 5/2021 | Adams | ............... | B62D 25/2054 |
| 2021/0188363 A1* | 6/2021 | Lozier | ............... | B29C 66/522 |
| 2021/0387560 A1* | 12/2021 | Buday | ............... | B62D 23/005 |
| 2022/0097777 A1* | 3/2022 | Letendre | ............... | B62D 25/20 |
| 2022/0145613 A1* | 5/2022 | Haynes | ............... | E04H 1/1222 |

\* cited by examiner

RECREATIONAL VEHICLE TRAILER CHASSIS

BACKGROUND OF THE INVENTION

1. Field of the Invention

The present invention relates to a recreational vehicle trailer chassis structure providing higher weight carrying capacity, lower center of gravity, increased torsional rigidity, optimized handling, with a very large basement storage area allowing for better packaging and layout of utilities, appliances and mechanicals which increases above and below floor storage areas while increasing the vehicle aerodynamics.

2. Description of Related Art

A tow-able recreational vehicle referred to as an RV is basically a trailer home on wheels, used for short term vacations, weekends or longer-term living quarters for full timers. These RVs provide all the amenities you would have in a permanent home, but on a smaller more compacted scale. The major advantage is they are on wheels and can be easily transported and moved to a RV park with full hook ups to all utilities or used for what is referred to as dry camping out in the wilderness as they are fully self-contained with kitchens, bathrooms, dinettes, bedrooms, couches, chairs, hot and cold running water, water tanks, propane tanks, sinks and toilet holding tanks. They are also equipped with batteries to run lights and water pumps, or generators to do the same with the addition of 110-volt power.

About 25% of tow-able trailers sold are referred to as 5th wheel Trailers with a raised front living section, with a conventional pin or ball style hitch that couples inside a pickup truck box. About 75% of the rest of the tow-able trailers sold are called Travel Trailers and have one level living section, towed using a conventional ball style hitch, also towed mostly with trucks and SUVs. These towables can be up to 45 feet in length, 8.6 feet wide, 13.5 feet in height, with GVWR's of up to 24,000 lbs. The chassis on towables being built today use I beam main frame rails with perpendicular nonstructural web truss cross-members to distribute stationary loads typical of buildings or bridge construction that are permanent structures and do not have a lot of movement which is not the best construction method for over the road vehicles. These simple old design chassis frames experience lots of frame twist and road force jounce being put into the trailer body from too light and poorly designed frames and suspension systems. These current recreational vehicle chassis have vehicle stability issues as they are built too high off the ground affecting aerodynamics, they have unbalanced floor plan designs with improper utility and appliance placement and are too light GVWR for the loads they carry and dynamic road forces they experience. They also have reduced above floor storage in the living quarters as much of the utility components like water heaters, water pumps, furnaces and ducting, electrical panels/converters, have to be installed above the floor inside the trailer. Furthermore, they have limited below living floor area storage with water tanks placed usually above floor, grey and black holding tanks and generators placed inside the frame rails with propane tanks, spare tires either placed outside the trailer body on hitch framing or below the underbelly as there is not a lot of other space to put them with the current designs.

SUMMARY OF THE INVENTION

The present invention includes two main frame rails running front to back with a series of perpendicular connecting main cross-members with a main living area floor framing on top to form a structural configuration designed and engineered to increase the torsional horizontal and vertical rigidity of the frame while reducing the total weight, with axle assemblies below. The main floor and support framing has a front and middle rear living area generally divided by the direction of structural web beam trusses. Above the rearward main frame rails is the rear main floor formed with a plurality of frame members to support RV appliances, equipment, exterior body weight and interior furnishings. Between the rearward main frame rails and below the rear and middle floor support framing are structural web rod beam trusses perpendicular to the main frame rails integrated with vertical support columns that connect the main frame to the rear and middle living area floor framing. Above the forward main frame rails and vertical support columns is the front floor framing with a plurality of frame members along with structural web beam trusses running parallel with the forward living area floor that also further increases horizontal and vertical structural rigidity. The vertical support columns are placed between the main frame rails and the main floor framing adding more height and width to the basement area space. Outward from the main frame outriggers and vertical support columns run front to back side saddle framing to allow access to the large basement storage area internally and externally via access from the outside. The furthermost forward floor framing sections is where the hitch structure and hitch are located.

The present invention further provides more cubic square feet of below floor basement storage space for equipment, utility packaging layouts and placement for electrical panels boxes, power converters/inverters, hot water heaters, pumps and supply lines, furnaces with ducting, air conditioners with ducting, hot and cold water lines, room slide tubes, power generators, propane and gas tanks, fresh water grey and black holding tanks, spare tires, interior and exterior partial or full pass through storage. With all the above RV equipment and utilities placed below the main living area floor, this further allows for additional usable storage space above the main floor interior, in cabinets under beds, under couches and dinettes, and inside closets.

Further objects, features and advantages of this invention will become readily apparent to persons skilled in the art after a review of the following description with reference to the drawings and claims that are appended to and form a part of the specifications.

DESCRIPTION

DETAILED DESCRIPTION OF THE EMBODIMENTS OF THE INVENTION

Figure 1:
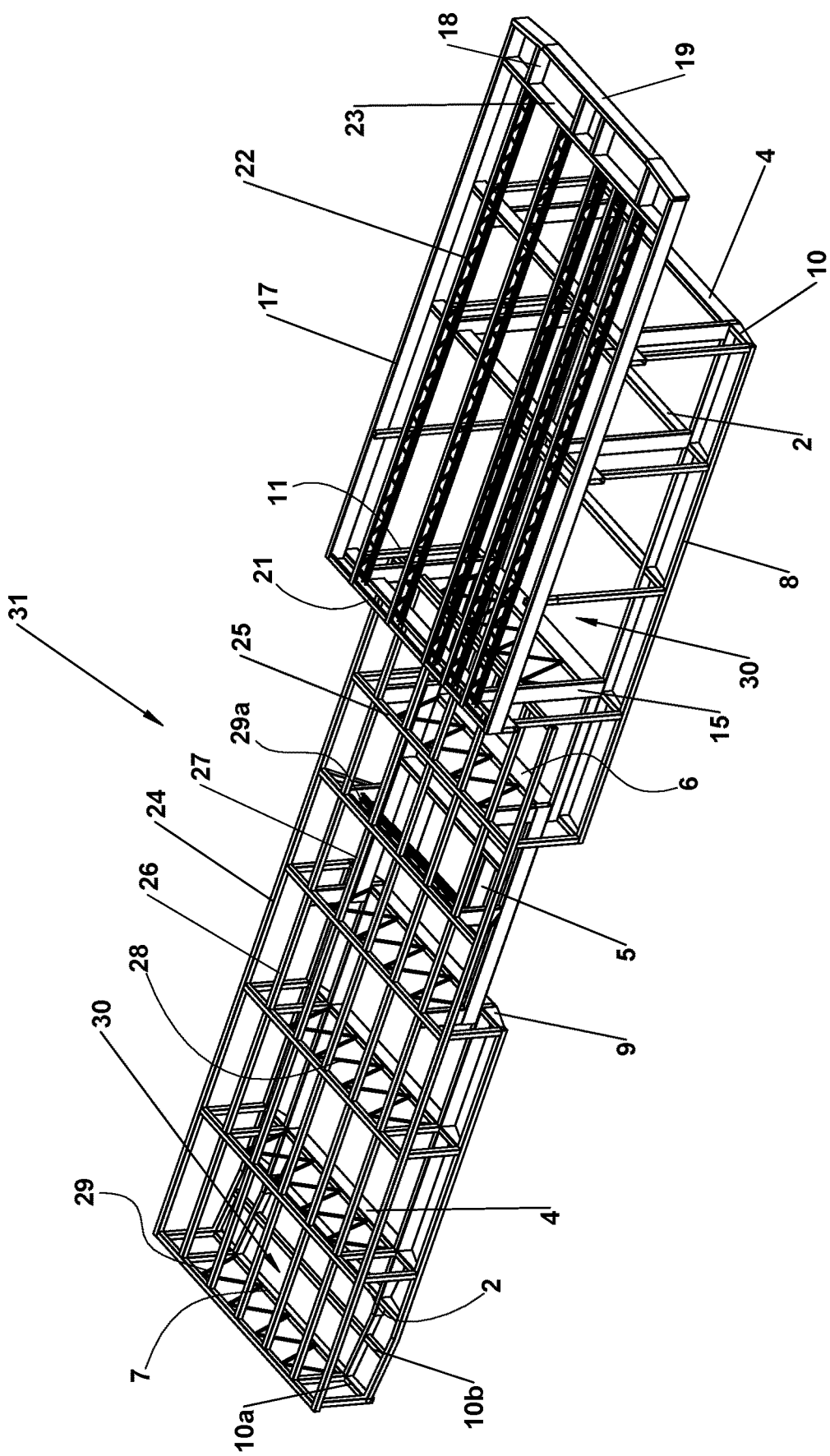
FIG. 1 illustration of the recreational vehicle trailer chassis perspective view.
Figure 2:
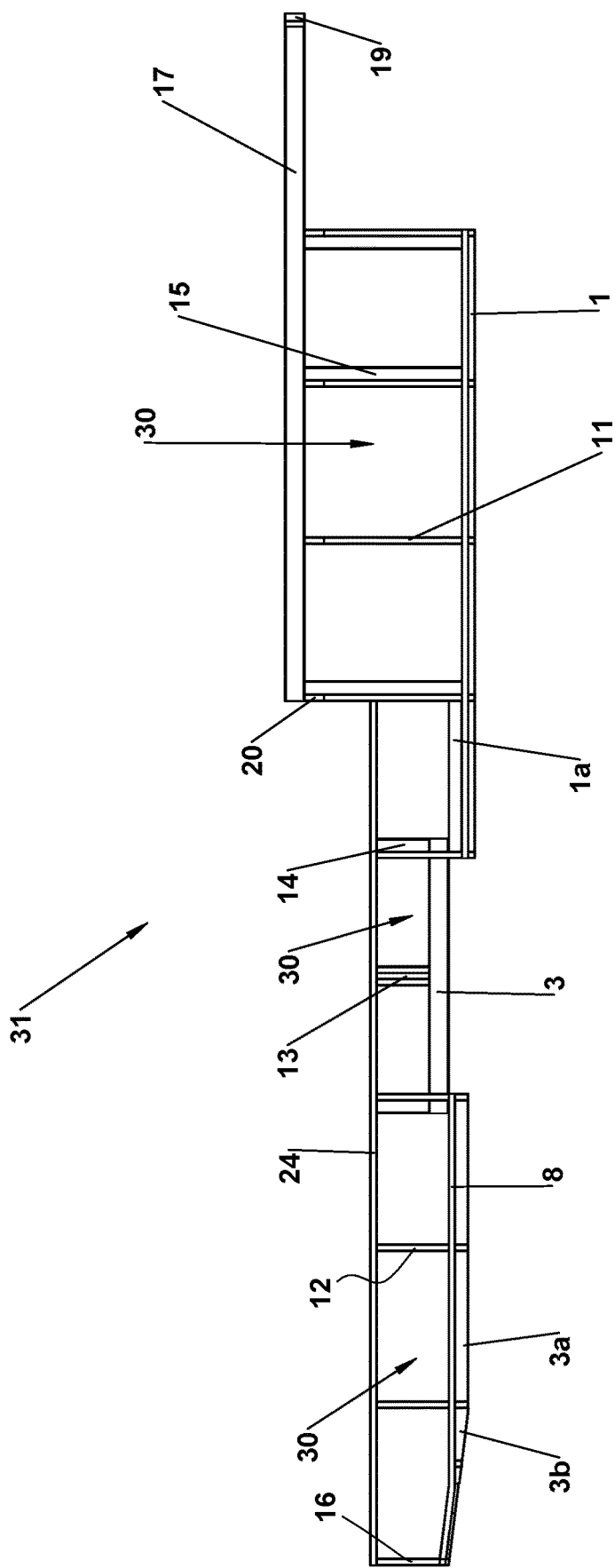
FIG. 2 illustration of the recreational vehicle trailer chassis side view.

Referring to FIG. 1 the recreational vehicle trailer chassis by reference number is 31, fabricated to provide a strong advanced designed and engineered frame, with a very large cubic feet area of below rear, main and front floor basement storage space 30 for installation of commonly used utilities, RV equipment and mechanicals, easily accessible from inside and from the exterior. As shown in FIGS. 1-2 the recreational vehicle trailer chassis 31, is constructed using all or a combination of rectangular tubing, box tubing, "C"-channel, round tubing, stampings, angle, T bar, flat, rod, wire and any variation thereof. Materials for construction will use all or a combination of steel, aluminum, carbon fiber, and any variation thereof, with varying gauge wall thickness and materials section sizing depending on load carrying requirements and design requirements. Construction and fabrication procedures use all or a combination of welding, fish-plate, gussets, bolting, screwing, gluing, stamping, forming, molding, hydro-forming, riveting in the final assembly process. The complete highly designed and engineered chassis 31 uses advanced strength materials for less deflection, providing less vertical and horizontal torsional bending which allows the chassis and finished trailer body to better handle static, dynamic and braking road forces while saving overall vehicle weight. With the chassis 31 constructed much lower to the ground, it further helps to reduce aerodynamic drag, which enhances stability, towability and increases fuel mileage.

The plural main frame rails 1, 1a, 3, 3a, 3b run forward to rear with 1a being a frame stiffener 1a sitting on top of rails, and at the rear of rail 3b turning up to allow for more ground clearance that all combine to form a strong structural beam. Attached outward from main frame rails 1, 1a, 3, 3a, 3b, are perpendicular outriggers 9, 10, 10a, 10b, attached to outside lower wall support frame rails 8. Cross-members 2, 4, 6, 7 in varying sizes with support member 5 attached between, further attached between main frame rails 1, 1a, 3, 3a, 3b to cumulatively provide reduced vertical and horizontal torsional frame bending and twisting. Attaching vertically web rods 28, 29, 29a between main rear, middle cross members 4,6,7 to upper deck rear main framing 25 become integrated structural web rod trusses that improve floor support load capacity and side to side rigidity. Rear vertical inner columns 12, 14, 16 attach from 1a frame stiffener 1a main frame rails 3, 3a, 3b to rear, middle, rear upper deck framing 25 that creates the deep rear, middle basement area 30, along with rear, middle vertical outer columns 12, 13, 16 attaching upper deck framing 25 and to rearward outside lower support framing 8 for side saddle interior and exterior storage area 30 access. Rear upper outer floor 24 longitudinal exterior wall support rail is attached to upper deck framing rail 25. Rear and middle upper deck floor support cross-members 26, 27 are attached between rear and middle upper deck 25 cross-members for additional floor support framing.

Figure 3:
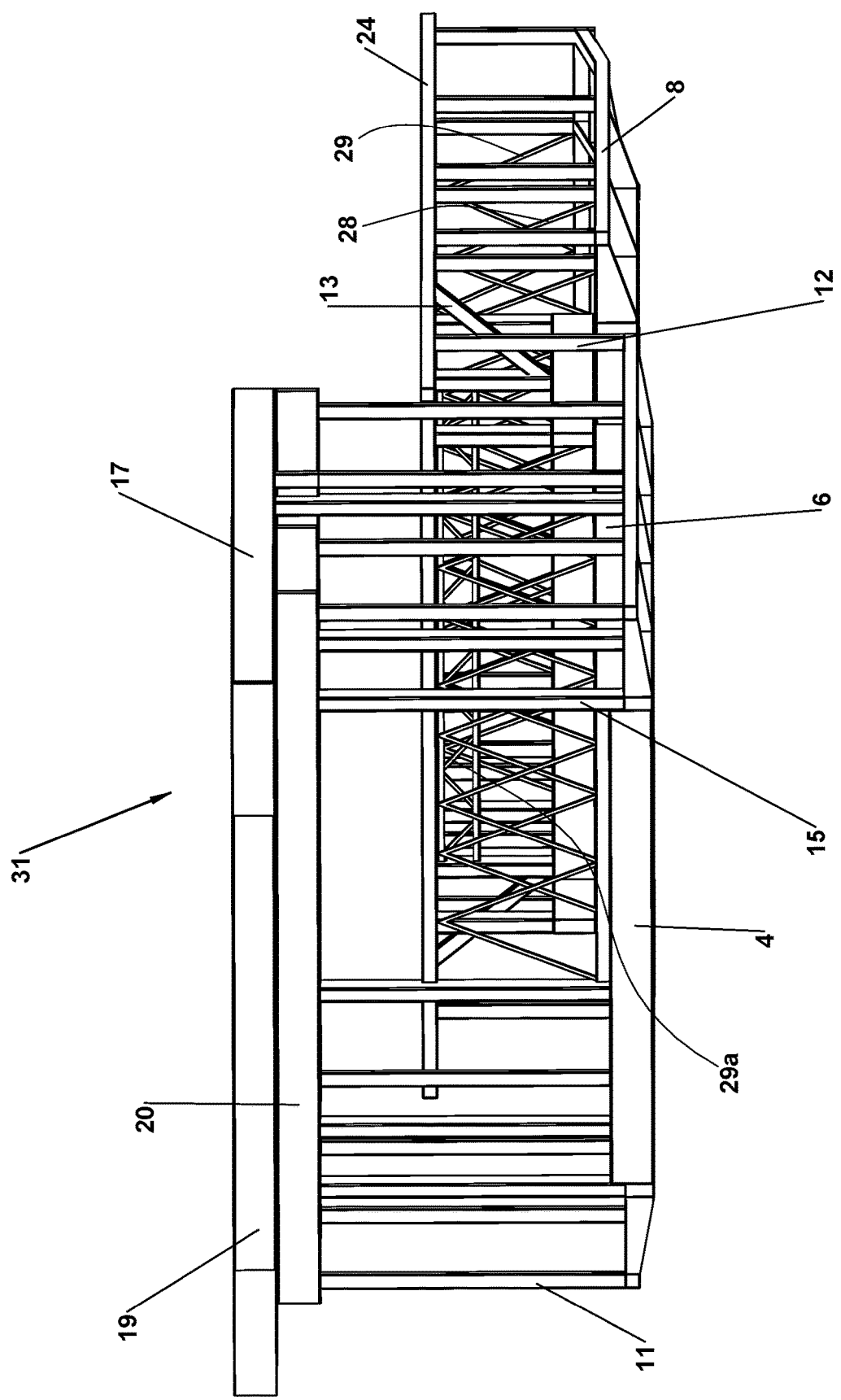
FIG. 3 illustration of the recreational vehicle trailer chassis front perspective view.
Figure 4:
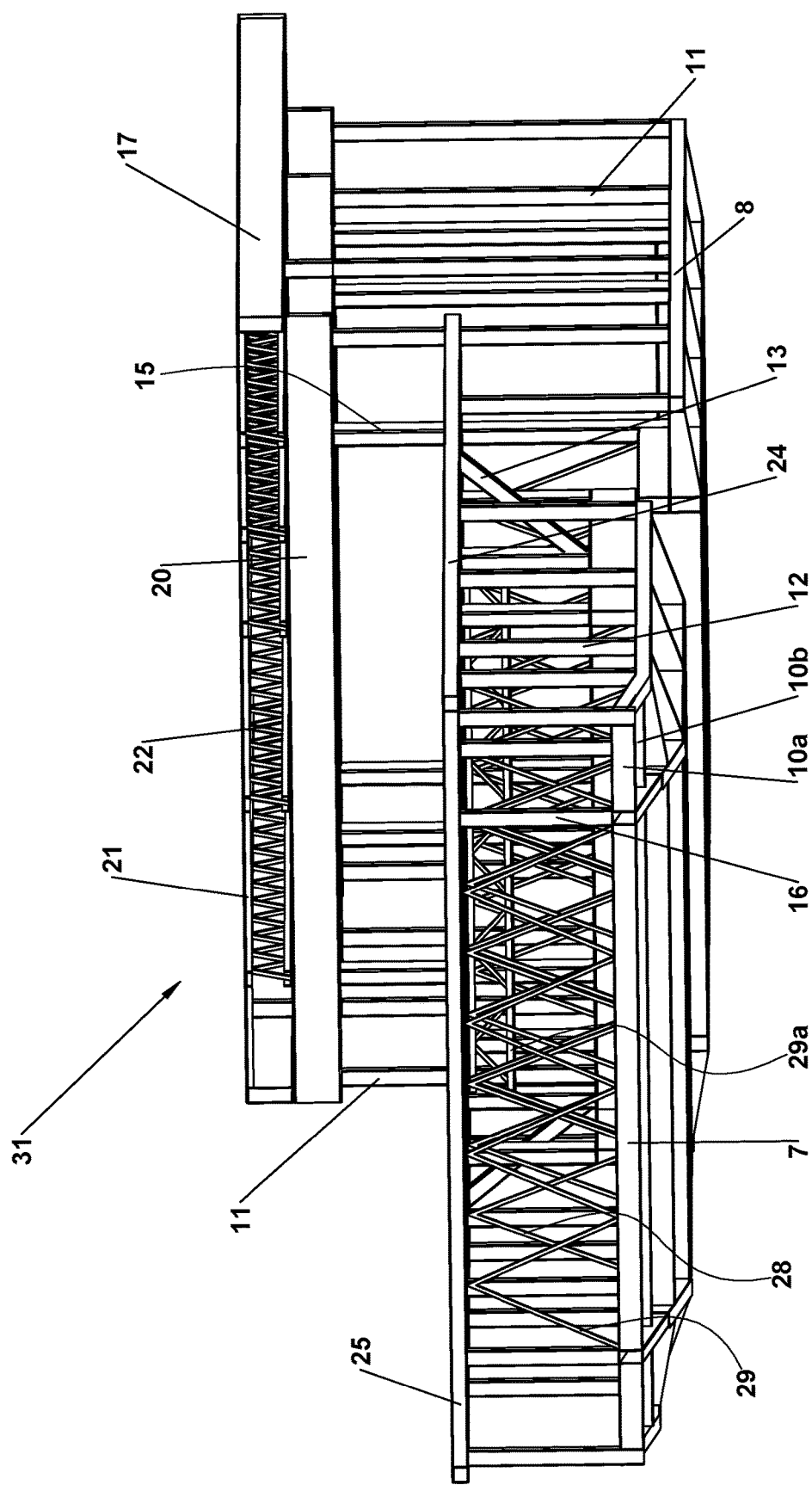
FIG. 4 illustration of the recreational vehicle trailer chassis rear perspective view.

Moving forward to the front of the recreational vehicle trailer chassis as shown additionally in FIGS. 3-4 are the vertical inner columns 15 which sit above main frame rails 1 attaching to upper deck 20 perpendicular cross-member framing supporting upper forward deck framing 17, 22 with forward deck framing 22 being a structural integrated web rod truss, and web beam truss 21 attached perpendicularly which secures the web beam truss 21 together and cumulatively provides this front structure reducing horizontal torsional deck bending and twisting.

The area between the first and the third vertical column 15 and between upper deck rails 17 and lower main frame rail 1 is mostly void of any RV equipment or utilities thus forming a very large amount of cubic foot front basement area space 30 with access from inside and from the exterior.

Outward vertical columns 11 are the exterior side saddle access storage framing, attached to forward upper deck framing 17 and to forward outside lower side 8 saddle support framing, further supported by outriggers 10 also allowing access to interior and exterior basement storage areas 30. Forward most upper deck framing as shown in FIG. 1 cross-member structure 19 attaches with framing supports 18 for the pin box hitch then to cross-member 23, then to longitudinal upper deck 17 outward framing and longitudinal upper inward structural web rod trusses 22, also supplying increased horizontal and vertical torsional rigidity to the complete front structure.

It is understood that the present invention is not limited to the embodiments described above but encompasses any and all embodiments within the scope of the following claims.

DESCRIPTION OF THE DRAWINGS—REFERENCE NUMERALS

ALL REFERENCES from above paragraphs.
The following list refers to the drawings:
Item Description
1,1a, 3, 3a,3b plural main frame rails
1a frame stiffener
3b turning up frame rail
2, 4, 6, 7 Cross-members (varying sizes) main rear, middle cross members
5 in between support member
8 or (8) outside lower wall support frame rails
9, 10, 10a, 10b perpendicular outriggers
11 Outward vertical columns
13 Middle Vertical Inner column
12, 14, 16 Rear vertical inner columns
15 vertical inner columns
17 upper deck rails and outward framing
18 framing supports for the pin box hitch
19 cross-member structure
20 perpendicular cross-member framing
21 web beam truss
22 longitudinal upper inward structural web rod trusses
23 cross-member
24 Rear upper outer floor
25 upper deck rear main framing
26 Rear upper deck floor support cross-members
27 Middle upper deck floor support cross-members
28, 29, 29a web rods
30 basement storage space, basement area
31 recreational vehicle trailer chassis

I claim:

1. A recreational vehicle trailer chassis comprising: a pair of longitudinally placed lower rectangular main frame rails with varying distance between them separated by perpendicular rectangular cross-members with rod and box structural web beam trusses extending vertically upward to upper deck framing in a rear, middle framing section; a corresponding upper deck with a plurality of box tubing that runs a length and a width and that connects to a number of vertical support columns and a group of structural web rod beam support trusses; a rear, middle lower outboard side saddle box frame tubing rails above perpendicular outriggers with vertical columns connects to upper outboard side saddle box tubing rails attach to upper cross-member floor supports; a number of vertical rectangular columns above a forward lower main frame rails below perpendicular rectangular cross-members below longitudinal upper outward rectangular frame rails with inward rod and box structural web trusses; a hitch cross-member section with a plurality of rectangular box channel frame members, some angular, sits at the furthermost front of the chassis; a structural configuration section formed by the plurality of box rectangular tubing web beam trusses with a group of varying height and width sectioned off basement areas allowing full or partial pass thru storage accessible from outside with additional access to internal utilities RV equipment and mechanicals in the basement; a forward lower outboard side saddle box frame tubing rails above outboard perpendicular outriggers with vertical columns below upper cross-members below outward upper deck frame rails and inward structural web rod and box beam support trusses.

2. A recreational vehicle trailer chassis according to claim 1, where a structural rear, middle and front integrated triangle and trapezoid shaped structural web rod and box truss framing further increases the structural integrity and torsional rigidity.

3. A recreational vehicle trailer chassis according to claim 2, wherein a support width of the rear, middle and front integrated triangle and trapezoid shaped structural web rod and box truss framing can be increased or decreased to allow for variations in main frame rails widths.

4. A recreational vehicle trailer chassis according to claim 3, wherein a rear, middle and front framing of the chassis can integrate as a triangle or boxed or X structural web beam truss and/or a combination thereof to increase torsional rigidity.

5. A recreational vehicle trailer chassis according to claim 1, wherein the chassis consist of vertical upright columns for framing varying in length from a set of main frame rails for a main floor elevation to a set of upper main deck framing rails for a number of multilevel floor elevations.

6. A recreational vehicle trailer chassis according to claim 1, wherein one of the basement areas with taller vertical framing is oriented and spaced allowing for the largest cubic feet of an interior space, allowing for an exterior basement access, and having a fulcrumed weight distribution front to back.

7. A recreational vehicle trailer chassis according to claim 1, wherein the group of sectioned off basement area include a rear, a middle and a front basement area, each of which can be accessible for an interior and an exterior access for storage.

8. A recreational vehicle trailer chassis according to claim 7, wherein each of the rear, middle and forward basement areas are configured with a floor above the main frame rails cross-members and outriggers.

9. A recreational vehicle trailer chassis according to claim 1, where the chassis is reversed front to back and a framing structure is formed into the chassis to accept a 5th wheel hitch.

10. A recreational vehicle trailer chassis according to claim 1, wherein the chassis further incorporates room slide tube rails attached directly under the pair of rectangular main frame rails without cutting through a frame tubing and allowing more basement storage area height and allowing a greater structural integrity.

11. A recreational vehicle trailer chassis according to claim 1, wherein an area between the lower main frame rails, the cross-members and the outriggers allow for an amount of insulation for extreme cold weather conditions.

12. A recreational vehicle trailer chassis according to claim 1, wherein the main frame rails of the chassis are 8 to 12 inches configured closer to a ground level for a decreased aerodynamic drag and an increased vehicle stability.

13. A recreational vehicle trailer chassis according to claim 12, where the main frame rails of the chassis have low ground clearance allowing for increased utilities equipment and mechanical packaging areas thus lowering center of gravity.

14. A recreational vehicle trailer chassis according to claim 1, where the main frame rails and the cross-members of the chassis allow for lower placement of a number of utility and mechanical equipment in basement areas which results in an increased main floor living storage space.

15. A recreational vehicle trailer chassis according to claim 12, where the rear main frame at a tail section is raised upward to allow for an adequate curb over angle which avoids dragging the chassis with the low ground clearance.

* * * * *